United States Patent
Voois et al.

(10) Patent No.: US 8,069,205 B1
(45) Date of Patent: Nov. 29, 2011

(54) COMMUNICATIONS CONTROLLER AND METHOD THEREFOR

(75) Inventors: Paul A. Voois, Sunnyvale, CA (US); Frederic Artru, Montreal (CA)

(73) Assignee: 8x8, Inc., Sunnyvale, CA (US)

( * ) Notice: Subject to any disclaimer, the term of this patent is extended or adjusted under 35 U.S.C. 154(b) by 1717 days.

(21) Appl. No.: 09/597,704

(22) Filed: Jun. 16, 2000
(Under 37 CFR 1.47)

(51) Int. Cl.
G06F 15/16 (2006.01)
G06F 15/177 (2006.01)

(52) U.S. Cl. ........ 709/204; 709/205; 709/206; 709/218; 709/221

(58) Field of Classification Search .......... 709/204–206, 709/218, 208, 220, 223, 227, 228
See application file for complete search history.

(56) References Cited

U.S. PATENT DOCUMENTS

| | | | |
|---|---|---|---|
| 5,351,237 A | 9/1994 | Shinohara et al. | |
| 5,610,910 A | 3/1997 | Focsaneanu et al. | |
| 5,654,957 A | 8/1997 | Koyama | |
| 5,726,984 A | 3/1998 | Kubler et al. | |
| 5,761,280 A | 6/1998 | Noonen et al. | |
| 5,799,063 A | 8/1998 | Krane | |
| 5,805,587 A * | 9/1998 | Norris et al. | 370/352 |
| 5,809,188 A | 9/1998 | Tseng et al. | |
| 5,838,665 A | 11/1998 | Kahn et al. | |
| 5,848,143 A | 12/1998 | Andrews et al. | |
| 5,862,202 A | 1/1999 | Bashoura et al. | |
| 5,909,431 A | 6/1999 | Kuthyar et al. | |
| 5,961,599 A | 10/1999 | Kalavade et al. | |
| 5,963,547 A | 10/1999 | O'Neil et al. | |
| 5,966,427 A * | 10/1999 | Shaffer et al. | 379/15.05 |
| 5,970,065 A * | 10/1999 | Miloslavsky | 370/352 |
| 5,999,965 A * | 12/1999 | Kelly | 709/202 |
| 6,069,890 A | 5/2000 | White et al. | |
| 6,125,108 A * | 9/2000 | Shaffer et al. | 370/259 |
| 6,125,113 A * | 9/2000 | Farris et al. | 370/389 |
| 6,263,064 B1 * | 7/2001 | O'Neal et al. | 379/201.03 |
| 6,286,033 B1 * | 9/2001 | Kishinsky et al. | 709/203 |
| 6,337,858 B1 * | 1/2002 | Petty et al. | 370/356 |
| 6,366,578 B1 * | 4/2002 | Johnson | 370/353 |
| 6,404,764 B1 * | 6/2002 | Jones et al. | 370/352 |
| 6,411,697 B1 * | 6/2002 | Creamer et al. | 379/201.12 |
| 6,438,218 B1 | 8/2002 | Farris et al. | |
| 6,445,694 B1 * | 9/2002 | Swartz | 370/352 |
| 6,449,269 B1 * | 9/2002 | Edholm | 370/352 |

(Continued)

OTHER PUBLICATIONS

Schulzrinne et al. "RTP: A Transport Protocol for Real-Time Applications." RFC 3550 (prev. published Jan. 1996, obs. RFC 1889), Jul. 2003, 72 pgs.

(Continued)

*Primary Examiner* — Kristie Shingles
(74) *Attorney, Agent, or Firm* — Crawford Maunu PLLC (57) ABSTRACT

The present invention is directed to IP telephony communications control. A user-interface device is communicatively coupled to an IP communications link and adapted to provide communications control selections to a user via a display. A plurality of IP telephony devices are coupled to the IP communications link. Selections from the display are used for providing communications control including control of communications for at least one of the plurality of IP telephony devices. The user-interface device is adaptable for use by various types of users, such as system administrators, office administrators, and individual telephony device users. In this manner, efficient and flexible user control of IP telephony applications is effected using a portable operations platform that is adaptable for use by different users at various locations.

27 Claims, 4 Drawing Sheets

U.S. PATENT DOCUMENTS

| | | | |
|---|---|---|---|
| 6,449,646 B1 * | 9/2002 | Sikora et al. | 709/226 |
| 6,459,776 B1 * | 10/2002 | Aktas et al. | 379/88.13 |
| 6,493,324 B1 * | 12/2002 | Truetken | 370/261 |
| 6,556,565 B1 * | 4/2003 | Ward et al. | 370/356 |
| 6,584,185 B1 * | 6/2003 | Nixon | 379/201.01 |
| 6,611,590 B1 * | 8/2003 | Lu et al. | 379/265.09 |
| 6,614,899 B1 * | 9/2003 | Sollee et al. | 379/218.01 |
| 6,625,139 B2 * | 9/2003 | Miloslavsky et al. | 370/352 |
| 6,628,644 B1 * | 9/2003 | Nelson et al. | 370/352 |
| 6,731,626 B1 * | 5/2004 | Neyman | 370/352 |
| 6,747,970 B1 * | 6/2004 | Lamb et al. | 370/352 |
| 6,754,181 B1 * | 6/2004 | Elliott et al. | 370/252 |
| 6,757,363 B1 * | 6/2004 | Platt et al. | 379/88.11 |
| 6,760,324 B1 * | 7/2004 | Scott et al. | 370/352 |
| 6,782,412 B2 * | 8/2004 | Brophy et al. | 709/204 |
| 6,826,173 B1 * | 11/2004 | Kung et al. | 370/352 |
| 6,836,478 B1 * | 12/2004 | Huang et al. | 370/352 |
| 6,868,538 B1 * | 3/2005 | Nixon et al. | 717/100 |
| 6,885,658 B1 * | 4/2005 | Ress et al. | 370/352 |
| 6,892,230 B1 * | 5/2005 | Gu et al. | 709/220 |
| 6,907,449 B2 * | 6/2005 | Srinivasan | 709/204 |
| 6,950,441 B1 * | 9/2005 | Kaczmarczyk et al. | 370/467 |
| 7,006,455 B1 * | 2/2006 | Fandrianto et al. | 370/260 |
| 7,035,935 B1 * | 4/2006 | Voois et al. | 709/238 |
| 7,068,641 B1 * | 6/2006 | Allan et al. | 370/352 |
| 7,092,379 B1 | 8/2006 | Singh et al. | |
| 7,103,165 B2 * | 9/2006 | Baniak et al. | 379/201.02 |
| 7,111,056 B1 * | 9/2006 | Ramey et al. | 709/223 |
| 7,200,683 B1 * | 4/2007 | Wang et al. | 709/250 |
| 7,889,722 B2 | 2/2011 | Thompson | |
| 2002/0001302 A1 * | 1/2002 | Pickett | 370/352 |
| 2005/0267935 A1 * | 12/2005 | Gandhi et al. | 709/203 |

OTHER PUBLICATIONS

Weinschenk et al. "Mastering Voice, the Internet's Talk Show." tele.com, The McGraw Hill Companies, Inc. Jun. 3, 1996, pp. 1-6.

"Talk into the Machine." tele.com, The McGraw Hill Companies, Inc. Jun. 3, 1996, pp. 1-2.

"Talk Talk." tele.com, The McGraw Hill Companies, Inc. Jun. 3, 1996, pp. 1-7.

* cited by examiner

COMMUNICATIONS CONTROLLER AND METHOD THEREFOR

RELATED PATENT DOCUMENTS

This patent document is related to U.S. patent application Ser. No. 09/005,053, entitled "Videocommunicating Apparatus and Method Therefor", filed on Jan. 9, 1998 (now U.S. Pat. No. 6,124,882); to U.S. Provisional Patent Application Ser. No. 60/212,220, entitled "Communications System Architecture" and filed on Jun. 16, 2000; to U.S. patent application Ser. No. 09/880,706, entitled "Communications Service Provider Network" and filed on Jun. 13, 2001 (now U.S. Pat. No. 7,035,935); to U.S. Provisional Patent Application Ser. No. 60/212,221, entitled "IP Phone Circuit Arrangement and Method" and filed on Jun. 16, 2000; to U.S. Provisional Patent Application Ser. No. 60/211,993, entitled "High Availability IP Telephony" and filed on Jun. 16, 2000; to U.S. Provisional Patent Application Ser. No. 60/212,215, entitled "System Interface Implementation for Hosted iPBX" and filed on Jun. 16, 2000; to U.S. Provisional Patent Application Ser. No. 60/211,992, entitled "IP Telephony Station Equipment" and filed on Jun. 16, 2000; and to U.S. Provisional Patent Application Ser. No. 60/212,219, entitled "iPBX Hosting" and filed on Jun. 16, 2000. All of the above-mentioned documents are fully incorporated herein by reference.

FIELD OF THE INVENTION

The present invention relates to communication systems, and more particularly, to a communications controller and control methodology.

BACKGROUND OF THE INVENTION

The electronics industry continues to rely upon advances in technology to realize higher-functioning devices at cost-effective prices. For many communication applications, realizing higher-functioning devices in a cost-effective manner requires the creative use of communications channels. Many technologies have been developed that have enhanced communications. Examples include the Internet, facsimile applications, public switched telephone networks (PSTN), wireless telephones, voicemail systems, email systems, paging systems, conferencing systems, electronic calendars and appointment books, electronic address books, and video-image processing systems that communicate video data simultaneously with voice data over telephones and the Internet. As the popularity of these technologies increases, so does the need to merge and coordinate these technologies in a manner that is convenient and cost-effective for the user.

The above-mentioned technologies have been developed in a relatively isolated manner. Large-scale integration of multiple communications systems has been costly and difficult to achieve and manage. One difficulty stems from the variety of communications channels and data types used for various applications. For example, telephony signals can now be transmitted by methods and systems including traditional publicly-switched telephone networks (PSTN), Internet telephony service providers (ITSP), packet-based systems, digital wireless systems, analog wireless systems, private branch exchanges (PBX), cable systems, T1 systems, integrated service digital network (ISDN), and digital subscriber line (DSL) systems, to name a few. Many telephone systems, particularly for business applications, offer services including voicemail, facsimile, call forwarding, and other call-controls, but these systems are often costly, difficult to manage, limited in scope, and do not offer integration of various communications methods. In addition to difficulties inherent in coordinating telephony-type communications, the coordination of additional communications, such as text, video, or other data, provides additional challenges.

Widespread acceptance and usage of communication systems and services are largely a function of cost and user convenience. Therefore, widespread acceptance and usage of such technology cannot be forced, even when appropriately addressing marketing needs and overcoming the exorbitant costs of the mass production equipment.

The scalability of a communications system weighs heavily upon the acceptance of the system. As the face of today's workplace is changing, the ability to provide flexible communications services is becoming increasingly important. Many employees are highly mobile, moving between companies and between jobs within a company. When employees are added, leave or move, the communications systems for those employees must be modified. In addition, many employees work from several locations, such as a base office, home, or a branch office. To accommodate ongoing communications needs a user-friendly and user-reconfigurable system would be advantageous.

As technology advances, traditional distinctions between communications types, such as video, audio, email, and others are breaking down. Wireless telephones and modems are being adapted for Internet use, and Internet telephony communication applications are becoming more viable and even commonplace. For both unsophisticated and sophisticated users of such communication systems and services, the coordination of various communications methods and systems would be beneficial. In addition, it is important to provide scalable, cost-effective, user-friendly control over the communications networks and over the devices that interface with and configure the networks.

SUMMARY OF THE INVENTION

The present invention is directed to a communications arrangement adapted to control and coordinate various types of communications data in a manner that makes possible the break-down of traditional barriers preventing the integration of communications data types. In addition, the ease of use and cost-effectiveness of the present invention enable the use of such communications control and coordination in small to medium-sized business applications. The arrangement can be used from anywhere on an IP communications link, and is adaptable for use with any OOP-based interface. The present invention is exemplified in a number of implementations and applications, some of which are summarized below.

According to an example embodiment of the present invention, a user-programmable communications arrangement having a computer including a display is adapted to control an IP telephony system. The arrangement comprises a user interface and a programmable controller that are adapted to control an IP telephony system. The controller provides user-selected IP telephony configuration information to a control center communicatively coupled to a plurality of IP telephony devices. The user interface is adapted to display configuration information for one or more of the following: user control of an IP telephony device, office telephone administration control of a plurality of telephony devices, and system administrator control of telephony system configuration. The IP telephony configuration information is selected to control communications between, and to programmably configure, the control center and the plurality of IP telephony devices.

In another example embodiment of the present invention, a user-programmable communications system is adapted to control a communications network using OOP code. A plurality of telephony devices are coupled to an IP communications link and adapted to communicate IP telephony data. A computer station having an OOP interface is adapted to display communications information including telephony communications information and to provide communications control selections including telephony control selections to the IP communications link. The control selections are received at a programmable communications server having an IP telephony switch and an OOP interface coupled to the IP communications link. The server is adapted to control the communications network, including the plurality of telephony devices, in response to the selections received through the OOP interface.

The above summary of the present invention is not intended to describe each illustrated embodiment or every implementation of the present invention. The figures and detailed description that follow more particularly exemplify these embodiments.

BRIEF DESCRIPTION OF THE DRAWINGS

The invention may be more completely understood in consideration of the following detailed description of various embodiments of the invention in connection with the accompanying drawings, in which:

FIG. 2 is a user-interface display, according to another example embodiment of the present invention;

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

The present invention is believed to be applicable to various types of communications systems, and has been found to be particularly suited to systems requiring or benefiting from a user-friendly controller for managing various telephony communications data types via an Internet protocol (IP) network. While the present invention is not necessarily limited to such systems, various aspects of the invention may be appreciated through a discussion of various examples using this context.

According to an example embodiment of the present invention, a user-programmable communications network control arrangement is adapted to control the processing of communications data of various types using a cost-effective, user-friendly operations controller and control platform. The control arrangement includes a programmable computer station having an OOP interface and adapted to display communications information including telephony communications information. The displayed information includes control selections for the communications network, including selections for controlling the processing of telephony data. The selections are made at the computer station and passed to an IP communications link.

A programmable communications server having an IP telephony switch and an OOP interface coupled to the IP communications link receives the control selections. The server is further communicatively coupled to a plurality of telephony devices adapted to receive and process IP telephony data, and may include a connection to a PSTN through a gateway. The server uses the control selections to control communications in the communications network, such as between the plurality of telephony devices, or between a telephone coupled to the PSTN and one or more of the plurality of telephony devices. In this manner, a communications network having a variety of communications devices can be controlled using a portable and non-hardware-dependent OOP-based controller. For information regarding an example communications network to which the present invention may apply, reference may be made to U.S. Provisional Patent Application Ser. No. 60/212, 159, entitled "Communications Service Provider Network," filed concurrently herewith and fully incorporated herein by reference.

The OOP controller is configurable for use in various applications including system administration, office administration, personal communications management, and service provider administration of subscribers. In one example embodiment of the present invention, a series of OOP controllers is used in a user facility having telephony service through an IP telephony service provider. Each OOP controller in the series is programmed to provide various access and control levels to various users depending upon the level of access desired for each individual OOP controller user. Controller access can include various control selections, such as selections for global service provider controls, local system administration controls, office administrator functions, and end-user control functions for individual communications management. By using configurable OOP controllers, the facility's communications systems can be operated from any platform capable of operating on OOP, with each controller being configured based upon the status of the user making communications control selections.

Figure 1:
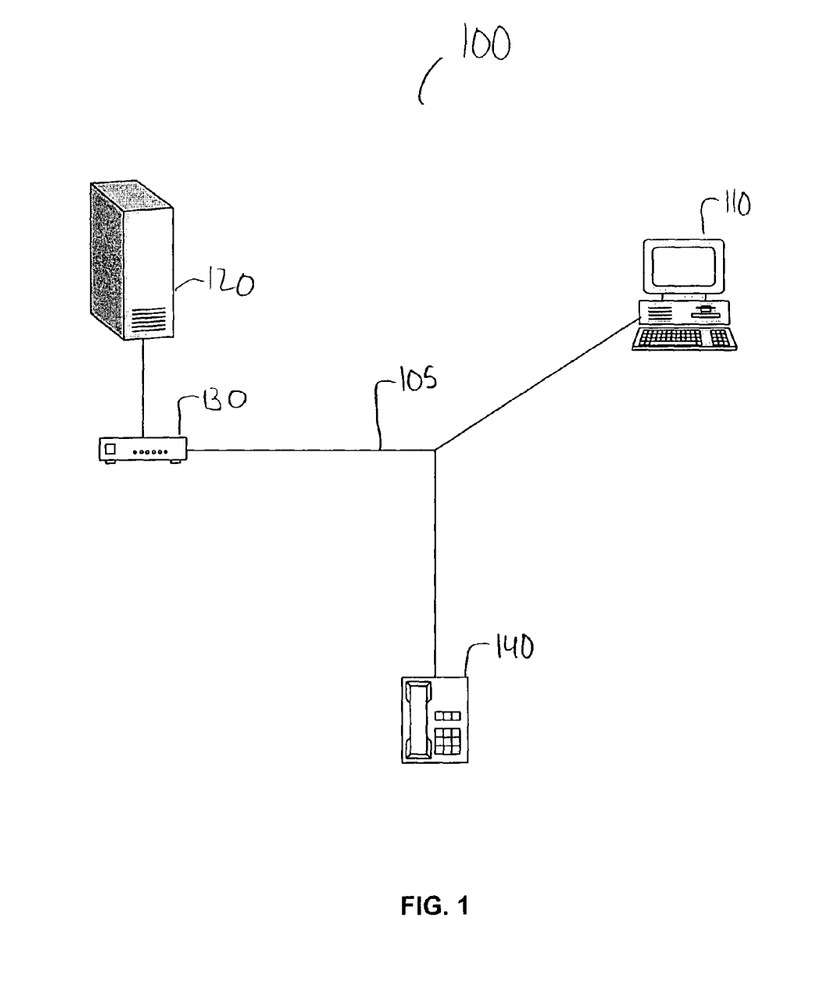
FIG. 1 is a user programmable communications controller coupled to an IP communications link, according to an example embodiment of the present invention.

FIG. 1 shows an example controller 110 for controlling a communications system 100 that is adapted to communicate data including IP telephony data, according to another example embodiment of the present invention. The controller 110 includes a computer communicatively coupled to an IP communications link 105. A control center 120 is coupled to the IP communications link 105 through a router 130. The control center stores and accesses configuration information for controlling the routing of data including IP telephony data to the controller 110 and an IP telephony device 140. The stored configuration information is accessible by the controller 110 for display. A user can view the displayed configuration information at the controller 110 and make changes to the configuration using a user interface at the controller 110.

The user interface provides the necessary modules permitting a user to implement control inputs for activating changes in the controller. These modules include, for example, input devices such as a keyboard, mouse, voice activation device, or touch screen, and the responsive functional software block for carrying out the implementation in response to the user input data. In addition, telephony controls for the IP telephony device 140 such as caller ID, speaker phone, answer, forward to voicemail, hold, and call termination are also accessible at the controller 110.

In one implementation, the control center 120 includes permission levels for receiving control selections from various users having different levels of access for making the selections. This is particularly useful because a global operating system, such as a system based on OOP, can be used by several different users sharing the same or different controllers 110. For example, an end user of the IP telephony device 140 may have access levels allowing her to configure the IP telephony device 140 and the communications sent to her. Such access levels can be controlled using a password or other security measure tailored for each particular use of the controller.

The user-selected configuration may include a variety of communications selections. For instance, individual telephony control configuration for an end-user may include one or more of the following example communication management options: speaker phone activation, call announce, call answer, call forward to voicemail, call forward to another number or IP telephony address, call hold, call waiting, call termination, display of caller ID, speed dial, call transfer, redial, voicemail forwarding, voicemail messaging, multiparty calling, call muting, video control, call tracking, call billing, and remote access control for enabling remote access to telephony services such as those described hereinabove. In addition, the user-selected configuration may include a variety of other non-telephony communications selections, such as for email, electronic billing and ordering, personal address book applications, and general display characteristics for the communications information and controls to be displayed at the controller 110.

For private access to particular communications data, security measures may be put in place for individual users to have exclusive access to configure the communication controls or retrieve personal information such as voicemail or email. FIG. 2 shows an example graphic arrangement that can be displayed at the controller 110 in connection with some or all of the above-mentioned example embodiments, or for other applications not specifically discussed herein. In one implementation, the graphic arrangement is tailored to each particular user. Each user can make selections for display, such as personalized speed dial functions, contact addresses and phone numbers, and display color and arrangements.

Figure 3:
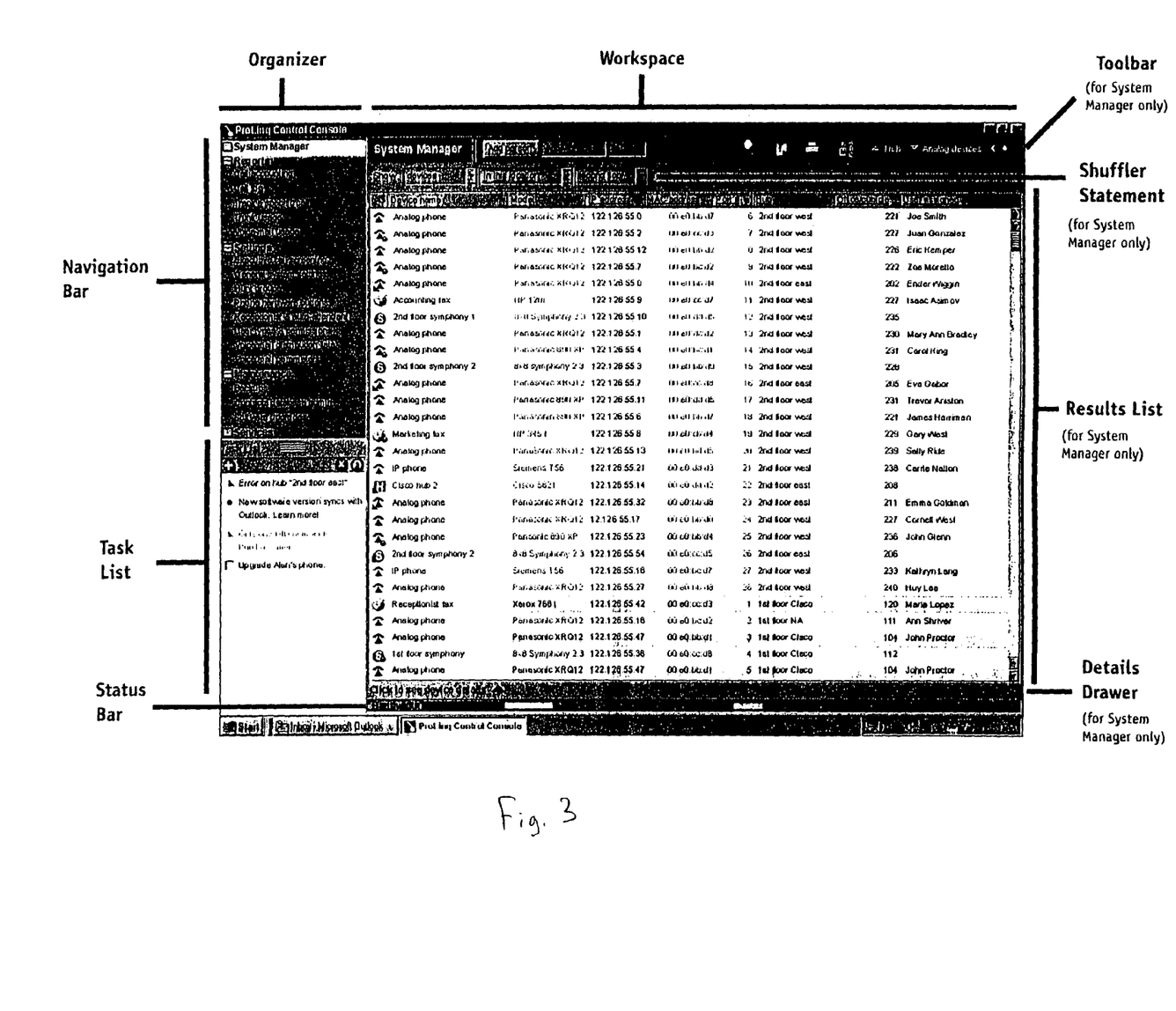
FIG. 3 is another user-interface display, according to another example embodiment of the present invention.

A system administrator can also access the configuration information using a password or other security measure that enables administration-level configuration options. The control center 120 recognizes the password and provides configuration information and control selections to the system administrator based on the permission level assigned to her. Typical system configuration selections may include, for example, telephony device address assignment, user-access permissions, system report generation, display settings for the controller, voice mail parameters, IP telephony device hardware configuration, system backups, call routing protocol, call accounting, and call logging. FIG. 3 shows an example graphic arrangement that can be displayed at the controller 110 in connection with some or all of the above-mentioned example embodiments, or for other applications not specifically discussed herein.

In addition to the end-user and system administrator examples provided herein, other users having various levels of permission can access and make selections from the configuration information based upon the permission level assigned to each user. For instance, an office administrator uses the controller 110 for routing incoming calls in a facility. In another instance, a service provider such as a telephone company or an Internet service provider (ISP) uses the controller 110 for controlling system settings for a user facility.

Figure 4:
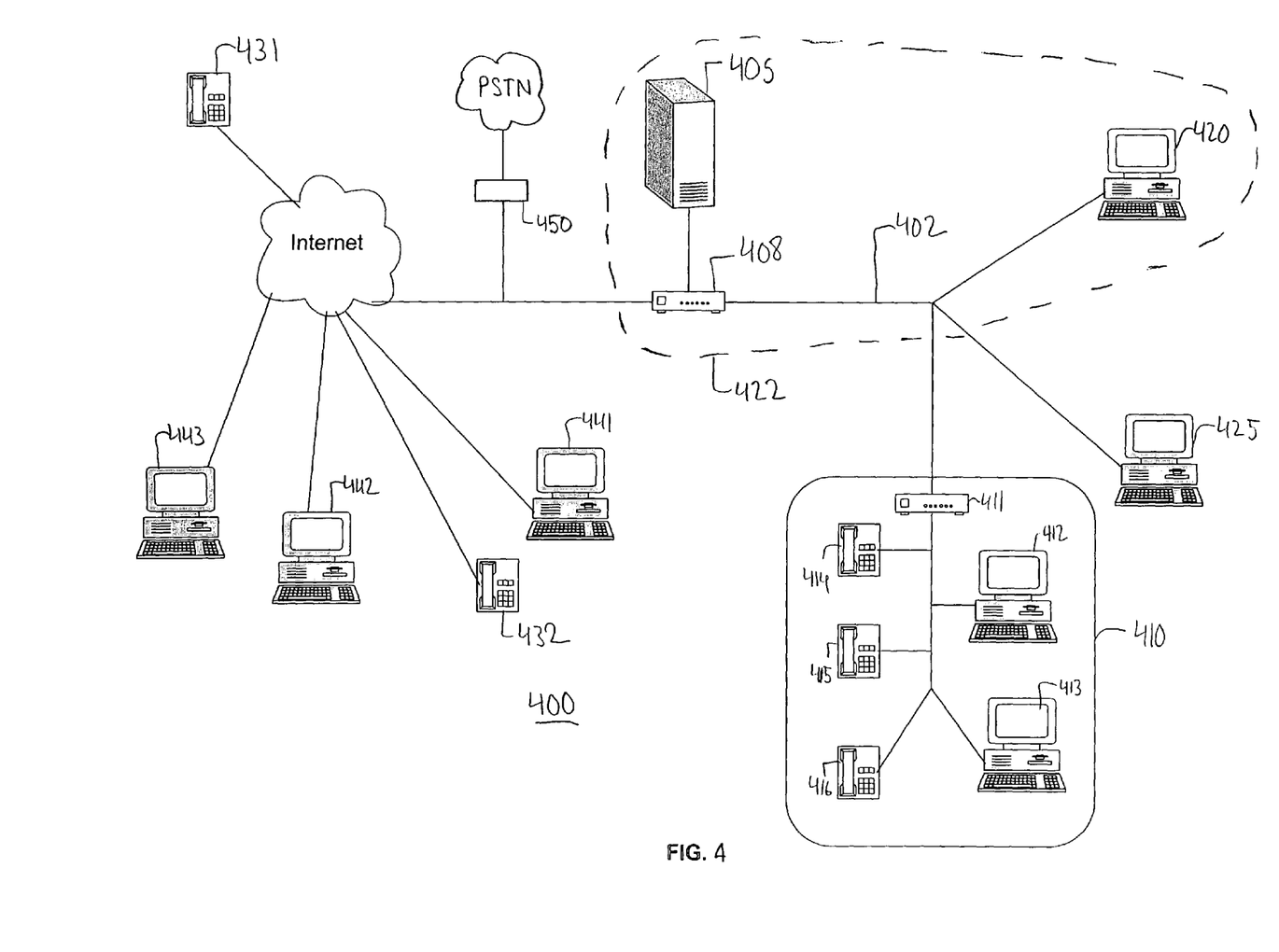
FIG. 4 is a user-programmable communications control system, according to another example embodiment of the present invention.

FIG. 4 shows an IP telephony communications system 400, according to another example embodiment of the present invention. Some of the basic communications principals of the system in FIG. 4 are similar to those discussed hereinabove in connection with FIG. 2. The system includes a plurality of user interface devices, each having OOP-based platforms, and IP telephony devices communicatively linked to an IP communications link 402. Any one of the communications devices 412, 413, 420, 425, 441, 442 and 443 can be used to control configuration or call control options for one or more of the telephony devices 414, 415, 416, 431 and 432. In one particular implementation, each of the communications devices is also adapted to function as an IP telephony device.

The system includes a control center 405 having an OOP interface and communicatively coupled to the rest of the components in the system 400 via a router 408. As shown, the Internet is used to connect to various components of the system, and a user facility 410 having several components coupled to the communications link 402 via a router 411. FIG. 4 shows an example application of the versatility of the controller and control platform described herein.

In one example embodiment of the present invention, the control center 405, router 408, and OOP-based controller 420 are located at a service provider location 422 adapted to provide communications services including IP telephony services to various users. Individual user 425 and user facility 410 are coupled to the service provider 422 via the IP communications link 402. Additional users are coupled to the service provider location 422 via the communications link and the Internet. Further users may also be communicatively coupled to the service provider via an IP/PSTN gateway 450. The controller 420 is used to make configuration selections at the control center 405 for controlling communications for each of the users. The configuration selections can be tailored to particular users and subscription packages using the controller interface 420. For example, billing options, call routing options, and user access options can be controlled using the controller 420.

A variety of users benefit from the use of an OOP control center and OOP-based controllers. For example, a single end-user having a computer 425 with an OOP platform and an IP telephony device can be communicatively coupled to the service provider via the IP communications link 402. The service provider assigns a particular phone number or numbers to the IP address at the computer 425, and programs the control center to enable a particular user permission level for the single end-user. Using a display interface at the computer 425, such as shown in FIG. 2, the end-user can make configuration and call control selections for her communications. When an outside caller, such as a caller using the PSTN, calls the number assigned to the user 424, the computer 425 alerts the user of the incoming call. The alert may, for example, include a traditional telephone ring, or an enhanced alert such as a call announce indicator displayed on a computer screen. The user can make call control selections from the call announce indicator, such as those described hereinabove. The user can also retrieve information about the caller, such as via caller ID or other information about the caller either stored at the computer 425, at the control center 405, or accompanying the caller ID.

The OOP interface enhances a user's ability to be mobile while maintaining communications services. For instance, the end user may use a portable computer as a controller, and use an interface such as shown in FIG. 2 for making configuration and call control selections. One example configuration selection includes selecting a particular IP address to which to route calls, such as when the user is traveling. The user can make configuration changes at the control center prior to leaving a home office, or connect through the Internet once arriving at a remote location. After the changes are made using the controller interface, the control center routes incoming telephone calls to the new IP address. This is particularly useful in today's mobile society as users often work from several office locations, from home, on vacation, or when traveling. In addition, because the OOP-based controller is adapted to access various communications information, email, voicemail, and contact information can be accessed from any computer having an OOP-based platform. Furthermore, telephone calls can also be received if the computer is further equipped with IP telephony capability. In this manner, the communications controller enables a user to re-route her telephone calls to virtually any IP address at a remote computer that supports OOP and IP telephony.

Another application for mobile users involves the use of a wireless telephone or wireless computer having IP telephony capabilities. For example, a user at the controller 425 can use the controller interface to configure the control center 405 to route calls to a wireless IP address. Incoming calls are routed directly to the wireless telephony device.

When the end-user is part of a user facility 410, the controller can be enabled with further functions for various users in the facility. For example, a system administrator having a computer interface 412 including an OOP-based platform can control the options for various IP telephone users in the facility using an interface such as shown in FIG. 3. This user-friendly interface enables the system administrator to control communications within the facility by providing particular programming and configuration permission levels for various users and by routing calls to IP addresses assigned to a particular number. One advantage of using the OOP-based controller is the ease of assignment of telephone numbers to particular IP addresses. For instance, when someone moves offices or locations, there is no need to run additional wiring or otherwise reconfigure existing wiring. The system administrator can access the control interface and edit the IP address for the particular number and effect the change.

The user facility 410 may also include a controller, such as controller 413, for use by an office assistant for monitoring and controlling incoming calls. The office assistant can answer calls for individuals within the facility using a control interface with the controller 413, such as shown in FIG. 2. For example, the assistant can control the call by pointing and clicking with a mouse or using another interface device such as voice recognition hardware. This enables the assistant to place the call on hold, to send the call to a particular location in or out of the facility, to send the call to voicemail, or to perform other typical call routing functions in a user-friendly manner. This is useful, for example, for forwarding calls to a user who is not at her normal workstation without having to dial the forwarding number.

Referring again to FIG. 4, and according to another example embodiment of the present invention, various other users are communicatively coupled to the control center 405 via the Internet. Such users may include individual users such as described in connection with controller 425, or may include a user facility such as facility 410. IP telephones 431 and 432 can be directly connected to the Internet for individual use, or may be used in conjunction with each other and/or with one or more of the computers 441, 442 and 443. Any of these devices may also be used with the user facility 410 or the individual user 425. The portability of the OOP-based controller interface enables such flexible use, and expands the current scope of telephony and other communications.

Other example embodiments of the present invention include one or more aspects of the other patent documents mentioned herein.

While the present invention has been described with reference to several particular example embodiments, those skilled in the art will recognize that many changes may be made thereto without departing from the spirit and scope of the present invention, which is set forth in the following claims.

What is claimed is:

1. A user-programmable IP telephony system comprising:
   a user interface to display IP telephony configuration options for at least one of: user control of an IP telephony device, office telephone administration control of a plurality of telephony devices, and system administrator control of telephony system configuration; and
   a programmable controller programmed to, receive a user's selection of one of the IP telephony configuration options from the user interface and, in response, programmably configure a control center server and a computer processor circuit at each of a plurality of IP telephony devices to which the control center server is communicatively coupled, and control communications between the control center server and the plurality of IP telephony devices via an IP telephony communications link.

2. The user-programmable IP telephony system of claim 1, wherein the programmable controller is programmed to, in response to configuration options received from the user interface, communicate programming data to an IP telephony device to program the computer processor circuit at the IP telephony device to respond to an incoming call by announcing the call via the display, the call announce being effected without overtaking currently-running program applications at the IP telephony device, and wherein at least the user interface is part of a programmed computer.

3. The user-programmable IP telephony system of claim 2, wherein the call announce is effected using a locally-installed OOP applet that runs in the background of the computer.

4. The user-programmable IP telephony system of claim 2, wherein the call announce displays user control options including at least one of: caller ID, speaker phone, answer, forward to voicemail, hold, and call termination.

5. The user-programmable IP telephony system of claim 1, wherein the user interface includes a graphic user interface (GUI).

6. The user-programmable IP telephony system of claim 1, wherein the programmable communications arrangement includes one of the plurality of IP telephony devices.

7. The user-programmable IP telephony system of claim 1, wherein the controller is programmed to access personal contact information.

8. The user-programmable IP telephony system of claim 7, wherein the personal contact information is arranged in a searchable database accessible by the controller, the database being accessible via user-defined shuffle-search statements.

9. The user-programmable IP telephony system of claim 1, wherein the controller is programmed to provide a control interface for system administration control of an IP telephony network, the interface being programmed to provide at least one of: IP telephony system configuration and system status information.

10. The user-programmable IP telephony system of claim 9, wherein the IP telephony system status information includes at least one of: IP address assignment information for telephony devices, user-access security control level settings, current telephony device hardware settings, display settings for the controller, and telephony device location information.

11. The user-programmable IP telephony system of claim 9, wherein the controller is programmed to control at least one of: telephony device address assignment, user-access permissions, system report generation, display settings for the controller, voice mail parameters, IP telephony device hardware configuration, system backups, call routing protocol, call accounting, email configuration settings and call logging.

12. The user-programmable IP telephony system of claim 1, wherein the controller is programmed to configure the control center and the plurality of IP telephony devices using OOP for providing user-selected IP telephony configuration information to the control center.

13. The user-programmable IP telephony system of claim 1, wherein user control of an IP telephony device includes active call control and call receive settings including at least one of: speaker phone activation, call answer, call forward to voicemail, call forward to another number or IP telephony address, call hold, call termination, display of caller ID, speed dial, call transfer, redial, voicemail forwarding, voicemail messaging, multi-party calling call muting, video control, and remote access control for remote access to telephony services.

14. The user-programmable IP telephony system of claim 1, wherein each of the plurality of IP telephony devices includes a CPU, and wherein the user interface and controller are further programmed to:
provide user-selected email configuration information to a control center communicatively coupled to each CPU;
display a control interface for at least one of: user control of email configuration, office administration control of the plurality of CPUs, and system administrator control of email system configuration; and
the email configuration information being selected to control communications between, and to programmably configure, the control center and the plurality of CPUs.

15. The user-programmable IP telephony system of claim 1, further including the control center, wherein the programmable controller is programmed to configure the control center by providing configuration information to control interactions between the control center and each of the plurality of IP telephony devices, the plurality of IP telephony devices being remote from the programmable controller.

16. The user-programmable IP telephony system of claim 1, further including the control center, wherein the programmable controller is programmed to configure each of the plurality of IP telephony devices via communications with the control center.

17. The user-programmable IP telephony system of claim 1, wherein the user interface and the programmable controller are part of a programmed computer used in an IP telephone.

18. A user-programmable IP telephony system comprising:
a user-interface device having a display, the device being programmed to provide IP telephony communications configuration information to a user via the display and to communicate IP telephony communications configuration selections from the user to a control center server; and
a programmable CPU communicatively coupled to the user interface device and having an OOP interface coupled to the IP telephony communications link, the CPU being programmed to receive the IP telephony communications configuration selections from the user-interface device and, in response to the received selections, programmably configure the control center server and selected IP telephony devices of the IP telephony communications system via the IP telephony communications link.

19. The user-programmable IP telephony system of claim 18, wherein the CPU is programmed to control the scope of IP telephony communications configuration selections that can be made by a particular user.

20. The user-programmable IP telephony system of claim 18, wherein the IP telephony system includes a memory storage device having user-access configuration data, wherein the CPU receives the configuration data for controlling the scope of configuration selections that can be made by a particular user.

21. The user-programmable IP telephony system of claim 20, wherein the memory storage device is programmed to send display information to the user-interface device using OOP, the display information including available IP telephony communications selections.

22. The user-programmable IP telephony system of claim 18, wherein the user-interface device communicates the configuration selections using OOP.

23. The user-programmable IP telephony system of claim 18, wherein the CPU is programmed to control selected functions of selected IP telephony devices of an IP telephony communications system by configuring a plurality of IP telephony devices.

24. A user-programmable communications control system for controlling a communications network using OOP code, the control system comprising:
a plurality of telephony devices coupled to an IP communications link and configured to communicate IP telephony data;
a computer station having an OOP interface, the station being programmed to display communications information including IP telephony communications information and to provide communications control selections including IP telephony control selections to the IP communications link; and
a programmable communications server having an IP telephony switch and an OOP interface coupled to the IP communications link and programmed to receive and process the communications control selections, the programmable communications server being programmed to control the communications network and configure a computer processor circuit at each of the plurality of telephony devices, in response to the selections received through the OOP interface.

25. The user-programmable communications control system of claim 24, wherein the scope of communications control selections that can be made at the computer station is controlled by the programmable communications server based on a predefined user-access permission level.

26. The user-programmable communications control system of claim 24, further comprising a plurality of the computer stations, wherein programmable communications server is programmed to receive communications control selections from each of the plurality of computer stations.

27. The user-programmable communications control system of claim 24, wherein
the computer station provides communications control selections input by an administrator user via the OOP interface in response to the user meeting a predefined user-access permission level, and
the programmable communications server controls all of the plurality of telephony devices in response to selections input at the OOP interface of the computer station by the administrator user.

* * * * *